(12) United States Patent
Skogerson et al.

(10) Patent No.: US 7,691,428 B2
(45) Date of Patent: Apr. 6, 2010

(54) NON-HYDROGENATED VEGETABLE OIL BASED SHORTENING CONTAINING AN ELEVATED DIGLYCERIDE EMULSIFIER COMPOSITION

(75) Inventors: Lawrence Skogerson, Mission Hills, KS (US); Troy Boutté, Overland Park, KS (US)

(73) Assignee: Caravan Ingredients Inc., Lenexa, KS (US)

( * ) Notice: Subject to any disclaimer, the term of this patent is extended or adjusted under 35 U.S.C. 154(b) by 552 days.

(21) Appl. No.: 11/279,728

(22) Filed: Apr. 13, 2006

(65) Prior Publication Data

US 2007/0148312 A1      Jun. 28, 2007

Related U.S. Application Data

(60) Provisional application No. 60/754,269, filed on Dec. 28, 2005.

(51) Int. Cl.
*A23D 9/00*      (2006.01)
(52) U.S. Cl. ..................... 426/607; 426/601
(58) Field of Classification Search ............... 426/601
See application file for complete search history.

(56) References Cited

U.S. PATENT DOCUMENTS

| | | | |
|---|---|---|---|
| 3,278,314 A | | 10/1966 | Colby et al. |
| 4,018,806 A | * | 4/1977 | Wyness et al. ............. 554/209 |
| 4,263,216 A | * | 4/1981 | Volpenhein ................ 554/164 |
| 4,656,045 A | * | 4/1987 | Bodor et al. ............... 426/601 |
| 5,160,759 A | | 11/1992 | Nomura et al. |
| 5,409,723 A | * | 4/1995 | Okutomi et al. ............ 426/559 |
| 5,470,598 A | * | 11/1995 | Scavone .................... 426/607 |
| 5,912,042 A | * | 6/1999 | Cain et al. ................. 426/607 |
| 6,022,579 A | | 2/2000 | Mori et al. |
| 6,033,703 A | * | 3/2000 | Roberts et al. ............. 426/312 |
| 6,106,879 A | * | 8/2000 | Mori et al. ................. 426/438 |
| 2002/0128500 A1 | | 9/2002 | Kolstad et al. |
| 2004/0209953 A1 | | 10/2004 | Lee |
| 2005/0026999 A1 | | 2/2005 | Faergemand et al. |
| 2005/0214436 A1 | | 9/2005 | Doucet |

OTHER PUBLICATIONS

Gunstone, F. 1983. Lipids in Foods, Chemistry, Biochemistry and Technology. Pergamon Press, New York. p. 149.*
Hui, Y. H. editor. 1996. Baileys Industrial Oil and Fat Products, vol. 3, 5th edition. John Wiley & Sons, New York. p. 80-82.*
Ernesto Hernandez, "Interesterification and Hydrogenation of Soybean Oil as the Basis for Producing Edible Margarines and Shortenings," Presentation to American Soybean Association, Aug. 2003, Queretano, Mexico, pp. 1-20.
Oct. 30, 2008 Office Action in U.S. Appl. No. 11/279,730.
Aug. 22, 2007 International Search Report and Written Opinion in PCT/US06/16299.
Feb. 13, 2009 International Preliminary Report on Patentability in PCT/US06/16299.
Oct. 2, 2007 International Search Report and Written Opinion in corresponding PCT/US06/49188.
Oct. 29, 2008 International Preliminary Report on Patentability in corresponding PCT/US06/49188.
Office Action dated May 1, 2009 in U.S. Appl. No. 11/279,730.
Office Action dated Jan. 22, 2009 in U.S. Appl. No. 11/279,733.

* cited by examiner

*Primary Examiner*—Carolyn A Paden
(74) *Attorney, Agent, or Firm*—Hovey Williams LLP

(57) ABSTRACT

A mono-, di-, and triglyceride emulsifier composition is provided that is obtained by the interesterification or glycerolysis of triglycerides with glycerol. The diglyceride portion w/w is at least about 65% to about 80%, and most preferably from about 70% to about 80% (HiDi). The high diglyceride emulsifier is useful in preparing a trans free shortening from a non-hydrogenated vegetable oil for use in bakery goods, which then have a significantly lower saturated fat content and a substantially higher polyunsaturated level than heretofore available when a conventional mono- and diglyceride emulsifier is used in the goods. A preferred shortening that is predominantly in stable beta prime crystalline form is prepared by mixing on a weight to weight basis from about 10% to about 30%, and preferably about 15% to 20%, of the HiDi composition, with the remainder being non-hydrogenated soybean oil.

4 Claims, 3 Drawing Sheets

NON-HYDROGENATED VEGETABLE OIL BASED SHORTENING CONTAINING AN ELEVATED DIGLYCERIDE EMULSIFIER COMPOSITION

RELATED APPLICATION

The present non-provisional patent application claims, with regard to all common subject matter, priority benefit of a provisional patent application titled ELEVATED DIGLYCERIDE EMULSIFIER COMPOSITION, SHORTENING, PUFF PASTRY MARGARINE AND PEANUT BUTTER CONTAINING THE EMULSIFIER COMPOSITION; U.S. Patent Application No. 60/754,269; filed Dec. 28, 2005. The identified provisional patent application is hereby incorporated by reference into the present non-provisional patent application.

BACKGROUND OF THE INVENTION

1. Field of the Invention

This invention relates to mono- and diglyceride emulsifier compositions obtained by the interesterification or glycerolysis of triglycerides with glycerol. When a triglyceride is reacted with glycerol at high temperatures, for example 200-250° C. under alkaline catalysis, a mixture of mono-, di-, and triglycerides is produced, with a small proportion of unreacted glycerol remaining. Commercial mono- and diglycerides usually contain 40-55% monoglycerides, 38-45% diglycerides, 8-12% triglycerides, and 1-7% free glycerol.

In accordance with this invention, the diglyceride portion w/w is increased to a level of at least about 65% to about 80%, more preferably from about 70 to at least about 80%, and most preferably about 74%, for example, by vacuum distillation, with the remaining monoglyceride portion being about 10% and the triglyceride portion of the order of 15%. Alternatively, a glycerine to fat ratio is selected to yield the required elevated diglyceride portion.

The high diglyceride emulsifier (herein "HiDi") has a number of uses, including structuring of a non-hydrogenated vegetable oil based shortening for food products such as bakery goods, which have significantly lower saturated fat content and a substantially higher polyunsaturated fat level than has heretofore been available with conventional mono- and diglyceride emulsifiers.

2. Description of the Prior Art

A number of food products, especially baked products such as bread, cakes and other pastries, icings, and the like, require the inclusion of fat-continuous emulsions such as shortenings and margarines. It is necessary for certain food applications that the shortenings or margarines have specific structural characteristics, such as plasticity, dispersibility, and solid fat content profile, i.e., the percent solid fat present at different temperatures.

In the past natural products such as butter or lard were used in food applications that required a plastic fat. For a number of reasons including availability and cost, shortenings and margarines have more recently been produced from vegetable oils. Since vegetable oils are liquids, they must be given structure by the introduction of solid fat in order to achieve the desired plasticity and solid fat content profile required for functionality. A number of approaches have been employed for generating the solid fatty materials needed to achieve the desired solid fat content profile for the particular temperatures required in a food processing operation. Two approaches that have been widely practiced in the past involved the partial hydrogenation of the vegetable oil, and/or the addition of solid fatty materials. Oil and solid fat blends can be interesterified to further improve functionality. When a solid fatty material is added, that material can be obtained either by hydrogenation of a fat or oil or by fractionation of solid fat from a naturally occurring fat. These approaches are well known among those skilled in the art of preparing fat-continuous emulsions such as shortenings and margarines.

The structured fats used in the production of fat-continuous emulsions contain saturated fatty acids and unsaturated fatty acids. Naturally occurring unsaturated fatty acids have carbon-carbon double bonds in a cis-configuration. Partial hydrogenation of fat can cause isomerization with some of the carbon-carbon double bonds of the cis-unsaturated fatty acids being converted to the trans-configuration. Until recently, trans fatty acids were nutritionally categorized along with cis fatty acids as unsaturated fatty acids without the demonstrated negative health consequences of saturated fatty acids. However, a great deal of research has recently implicated trans fat in the development of cardiovascular disease. Thus, the National Academy of Medicine and many nutritionists have advised that consumption of trans fats be limited as much as possible within the needs of a nutritionally adequate diet. Minimizing the presence of trans fatty acids in the diet requires that the efficient and economically advantageous practice of partial hydrogenation be eliminated or at least greatly reduced. Therefore, there is a need for alternative approaches that will permit the structuring of fats for use in fat-continuous emulsions such as shortenings and margarines without introduction of trans fatty acids or increase of the saturated fatty acid content.

SUMMARY OF THE INVENTION

It has now been found that an emulsifier having an elevated diglyceride content can provide the structure needed to prepare a trans free fat-continuous emulsion shortening that has desirable consistency, improved functionality, and characteristics equal to or better than conventional trans containing saturated fats or fats that have been partially hydrogenated. The emulsifiers that produce this effect are mono- and diglycerides produced from fully saturated fat sources and that have a higher than normal content of diglycerides. These HiDi emulsifiers function as well as standard stabilizers produced from partially hydrogenated cotton seed or soybean oil. Because the HiDi emulsifiers are especially effective in structuring vegetable oils at a low emulsifier concentration, the desired characteristics of the resulting shortening, margarine, or emulsifier additives are achieved without the inclusion of excessive saturated fat or partially hydrogenated fat containing trans fatty acids. The HiDi prepared shortening and margarine emulsifiers can therefore be used to produce baked and other food products, without the attendant negative effects on cardiovascular health of similar products produced with currently available fat-continuous emulsions containing trans fats.

Traditionally, the fat solids of margarines and shortenings have comprised a mixture of saturated fatty acids, trans fatty acids and unsaturated fatty acids. Generally, fats containing fatty acids with chain lengths from $C_{12}$ to $C_{22}$ have been used for preparing mono- and diglyceride emulsifiers, but the most common included chain lengths are $C_{16}$ and $C_{18}$. It has now been discovered that the typical blend of saturated fat and trans fat can be replaced by a mixture of saturated fat, unsaturated fat, and an emulsifier composition that contains high levels of diglycerides such as the HiDi type emulsifiers. The resulting blend of fats and HiDi emulsifier contains significantly less than 0.5 g of trans fat per serving of 14 g while margarines or shortenings from partially hydrogenated fats that are now commercially available contain as much as 2.8-4.0 g of trans fat per 14 g serving for margarines containing 80% fat. Therefore, the final food product containing the emulsifier of this invention can be labeled to have zero trans fat according to current FDA regulations.

Figure 1:
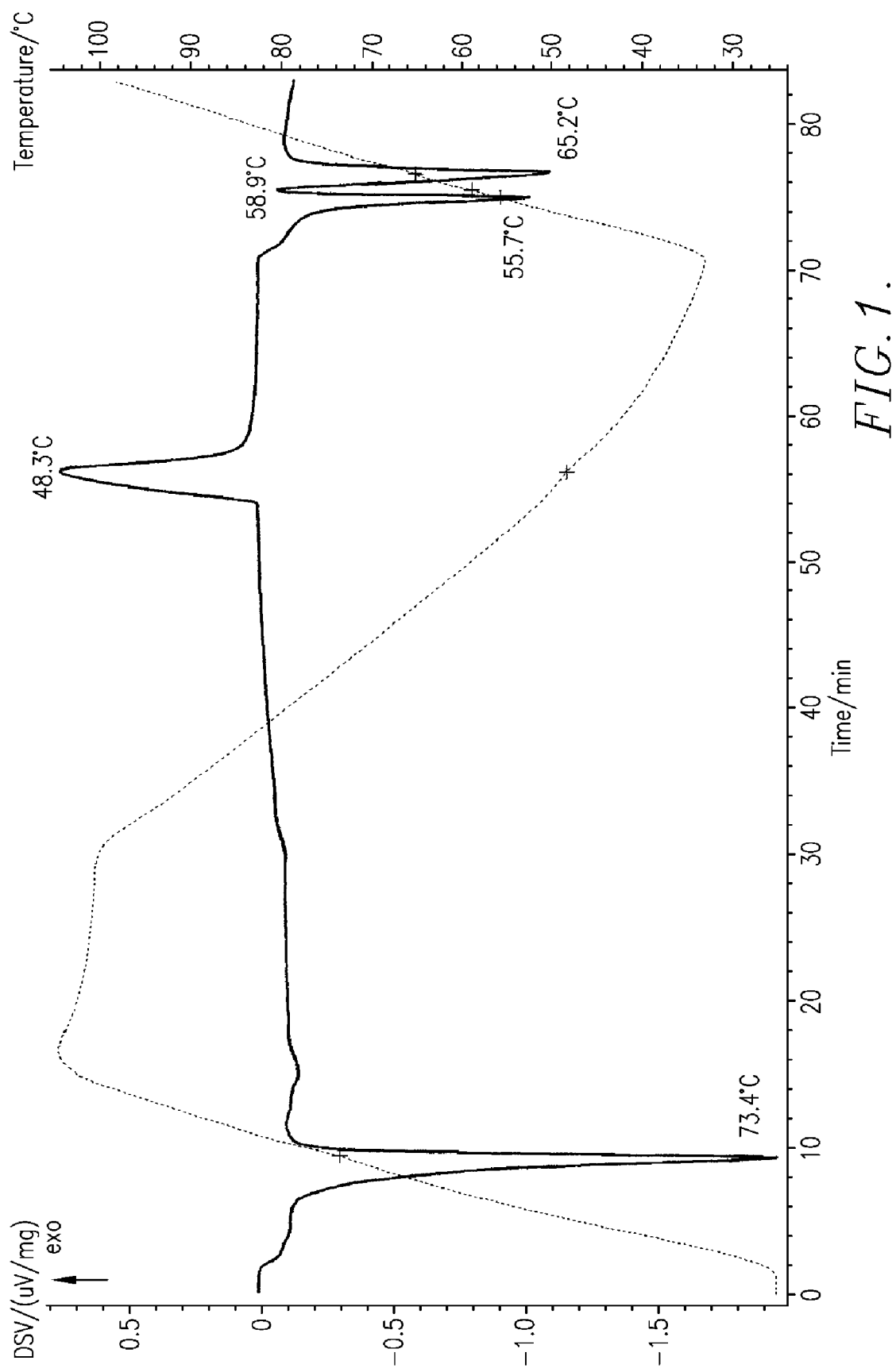
FIG. 1 is a graph of a Digital Scanning Calorimeter (DSC) analysis of an aged sample of fully hydrogenated soybean oil comparing the initial melting point of the sample with melting points after cooling and re-crystallization of the sample.

The graphs are of tests conducted on a NETZSCH STA 409 PG/PC Instrument.

DETAILED DESCRIPTION OF THE PREFERRED EMBODIMENT

The mono- and diglycerides that constitute this invention are preferably produced by interesterification of $C_{12}$-$C_{22}$ and preferably $C_{16}$-$C_{18}$ fat in the presence of glycerin and a catalyst such as calcium or sodium hydroxide. After the interesterification reaction, the catalyst is inactivated by addition of phosphoric acid and the excess glycerin is removed by distillation under vacuum. The interesterification reaction may also be carried out in the presence of an appropriate enzyme as the catalyst. The glycerin to fat ratio is selected to give a mono- and diglyceride composition w/w that falls within the parameters of Table I below.

TABLE I

Fatty acids $C_{12}$-$C_{22}$, preferably >80% $C_{16}$-$C_{18}$
Monoglycerides <30%; preferably <20%; most preferably about 10% or less
Diglycerides >65%; preferably from about 65% to about 80%; and most preferably from about 70% to about 75%
Triglycerides being the remainder Alternately, the selected fat may be interesterified in the presence of glycerin and a catalyst such as calcium or sodium hydroxide. After the interesterification reaction the catalyst is inactivated by addition of phosphoric acid and the excess glycerin is removed by an appropriate procedure such as distillation under vacuum. As a further alternative, a selected fatty acid may be esterified in the presence of glycerin and a catalyst such as calcium or sodium hydroxide. After the esterification reaction the catalyst is inactivated by addition of phosphoric acid and the excess glycerin is removed by an appropriate procedure such as distillation under vacuum. The interesterification or esterification reaction may also be carried out in the presence of an appropriate enzyme as the catalyst. The glycerin to fat ratio is picked to give a maximal level of monoglycerides. The resulting mono and diglyceride portion is subjected to distillation under vacuum to separate most of the monoglyceride component from the diglyceride component, to again provide a composition that is within the parameters of Table I.

Example

Fully hydrogenated soybean oil was interesterified with excess glycerin (ratio of three moles of glycerin to one mole of fat) in the presence of calcium hydroxide as the interesterification catalyst. After the reaction was completed phosphoric acid was added to inactivate the catalyst and the excess glycerin was removed by distillation under vacuum. The resulting mono- and diglyceride was subjected to distillation in a short path still to remove monoglycerides. The residual portion consisted of a new mono- and diglyceride portion (Sample 1) having the following composition, w/w:

TABLE II

| Sample 1 | |
|---|---|
| Monoglyceride | 10.9% |
| Diglyceride | 73.5% |
| Triglyceride | 15.6% |
| Iodine Value | 2.8 |

A quantity of Sample 1 was blended with RBD (refined, bleached and deodorized) soybean oil in the ratio of 80% of the soybean oil and 20% of Sample 1 to produce a shortening composition (Sample 2). The resulting Sample 2 shortening was compared with a commercial trans fat free shortening having a similar melting point:

TABLE III

| | Sample 2 Shortening | Commercial Shortening |
|---|---|---|
| Total Fat/serving | 13.3 g | 14.0 g |
| Saturated Fat | 4.3 g | 9.3 g |
| Trans Fat | <1.0 g | <1.0 g |
| Mono-unsaturated Fat | 2.6 g | 3.8 g |
| Polyunsaturated Fat | 6.6 g | 0.9 g |
| Carbohydrate | 0.7 g | 0.0 g |
| Calories | 123 | 126 |

The Sample 2 shortening prepared with the Sample 1 mono- and diglyceride composition had only 46% of the saturated fat content and contained 95% more unsaturated fat content as compared with a commercial trans free shortening prepared by mixing different conventional fractionated fats.

Other non-hydrogenated vegetable oils may be combined with the HiDi emulsifier to prepare a shortening including, but not limited to, canola oil, coconut oil, corn oil, cottonseed oil, flaxseed oil, palm oil, palm kernel oil, peanut oil, safflower oil, sesame oil, and sunflower oil may be used as the vegetable constituent in preparation of the high diglyceride composition. The ratio of vegetable oil to emulsifier on a weight to weight basis in the shortening should be from about 10% of the HiDi emulsifier to about 30% HiDi with the remainder being vegetable oil. The preferred ratio of emulsifier should be w/w from about 15% HiDi emulsifier to about 20% emulsifier, again with the remainder being vegetable oil.

It is understood that an emulsifier may be present primarily in one of three crystalline conditions, i.e., alpha crystals, beta prime crystals, and beta crystals. The alpha crystals melt at a lower point than beta prime crystals, and beta prime crystals melt at a lower melting point than beta crystals. Absent inclusion of a stabilizing agent, alpha crystalline form rapidly morphs into beta prime crystals and then the beta prime crystals ultimately are transformed into beta crystals. Beta prime is a smooth, small, fine crystal, whereas beta is a large, course, grainy crystal. Commercially useful shortenings should principally be beta prime fats in order to promote a smooth and creamy texture.

A typical heat flow differential scanning calorimeter has two heating discs that are in thermal contact with one another and are isolated from the surrounding environment. A metal pan is placed on each disc. One of the pans contains a sample to be tested, while the other is an empty reference pan. By heating both pans at a controlled, known rate, and measuring the heat flow or energy transfer between them, resulting from the differential in heat capacity of the reference pan and the sample, the thermal transition in the material contained in one of the pans is measured. The magnitude of difference, expressed as μV/mg between the empty pan and the pan with the sample in the DSC, is referred to herein as a DSC-defined melting point.

The graph of FIG. 1 is a DSC melting point analysis of fully hydrogenated soybean oil that had undergone aging at room temperature for a period of time of the order of two to three weeks. The dotted line of FIG. 1 is representative of the temperature of the sample, whereas the solid line is the energy expended during the analysis expressed as μV/mg. The sample melted in about 10 minutes. The initial DSC melting point of the aged sample was found to be about 73.4° C., thus confirming that the sample was in beta crystalline form. As it cooled, the sample was observed to re-crystallize at about 48.3° C. When the sample had cooled to near ambient temperature, it was remelted. Thus, the samples were only about 20 minutes old when they were remelted, as opposed to the three week aging period. The melting points of the remelted sample were determined to be 55.7° C. and 65.2° C. respectively, indicative of alpha and beta prime crystals.

Figure 2:
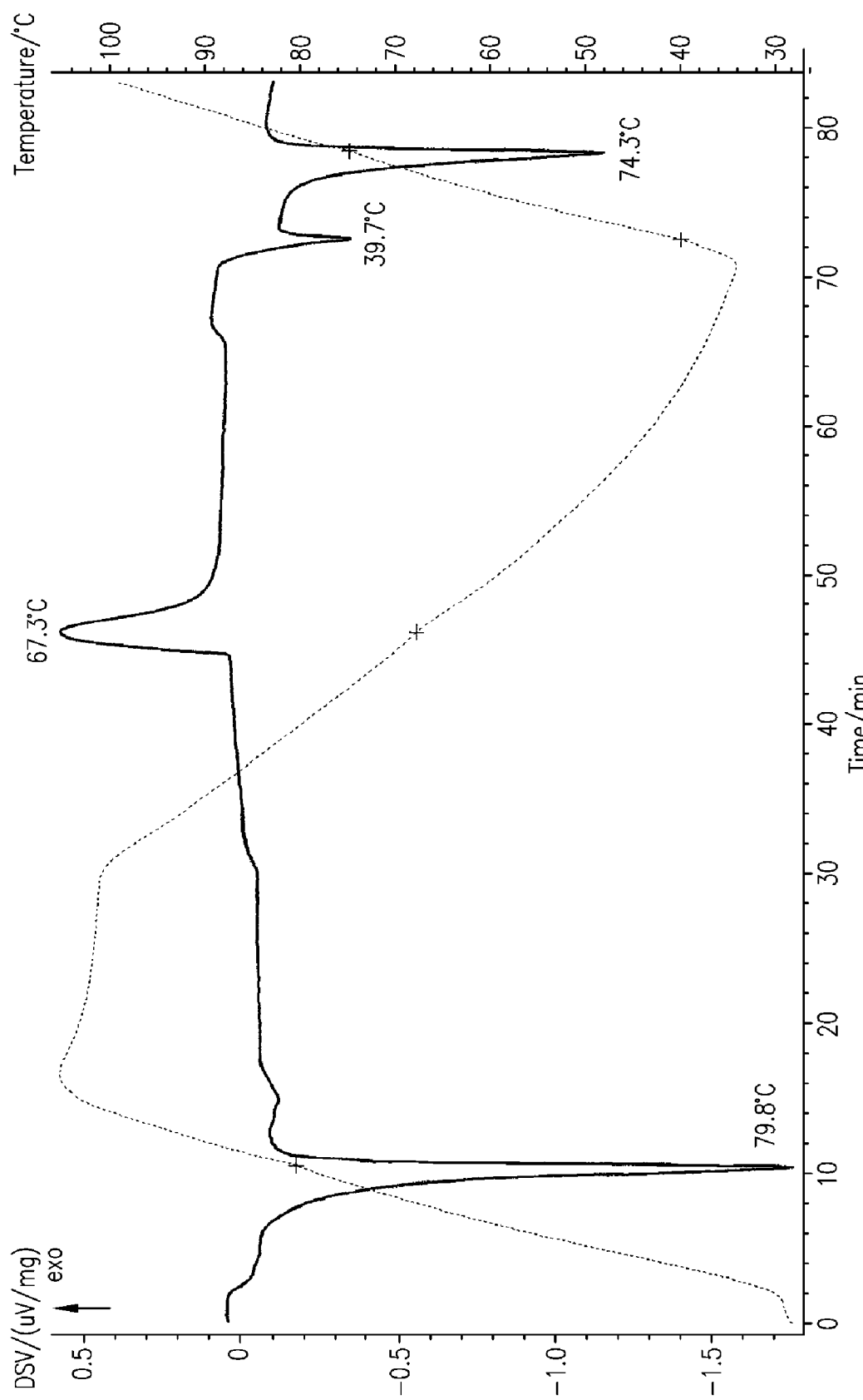
FIG. 2 is a graph of a DSC analysis of a monoglyceride sample containing about 94.5% total monoglycerides comparing the initial melting point of the sample with melting points after cooling and re-crystallization of the sample.

FIG. 2 is a graph of a DSC melting point analysis of a sample containing 94.5% total monoglycerides. In this instance, the initial melting point, after heating of the sample for about 10 minutes, was found to be 79.8° C., indicative of beta crystals. After 45 minutes, the re-crystallization temperature of the sample was observed to be 67.3° C. Cooling of the sample over a 20-minute period to a solid state followed by reheating of the sample, yielded a melting point of 74.3° C., similar to the initial melting point determination.

Figure 3:
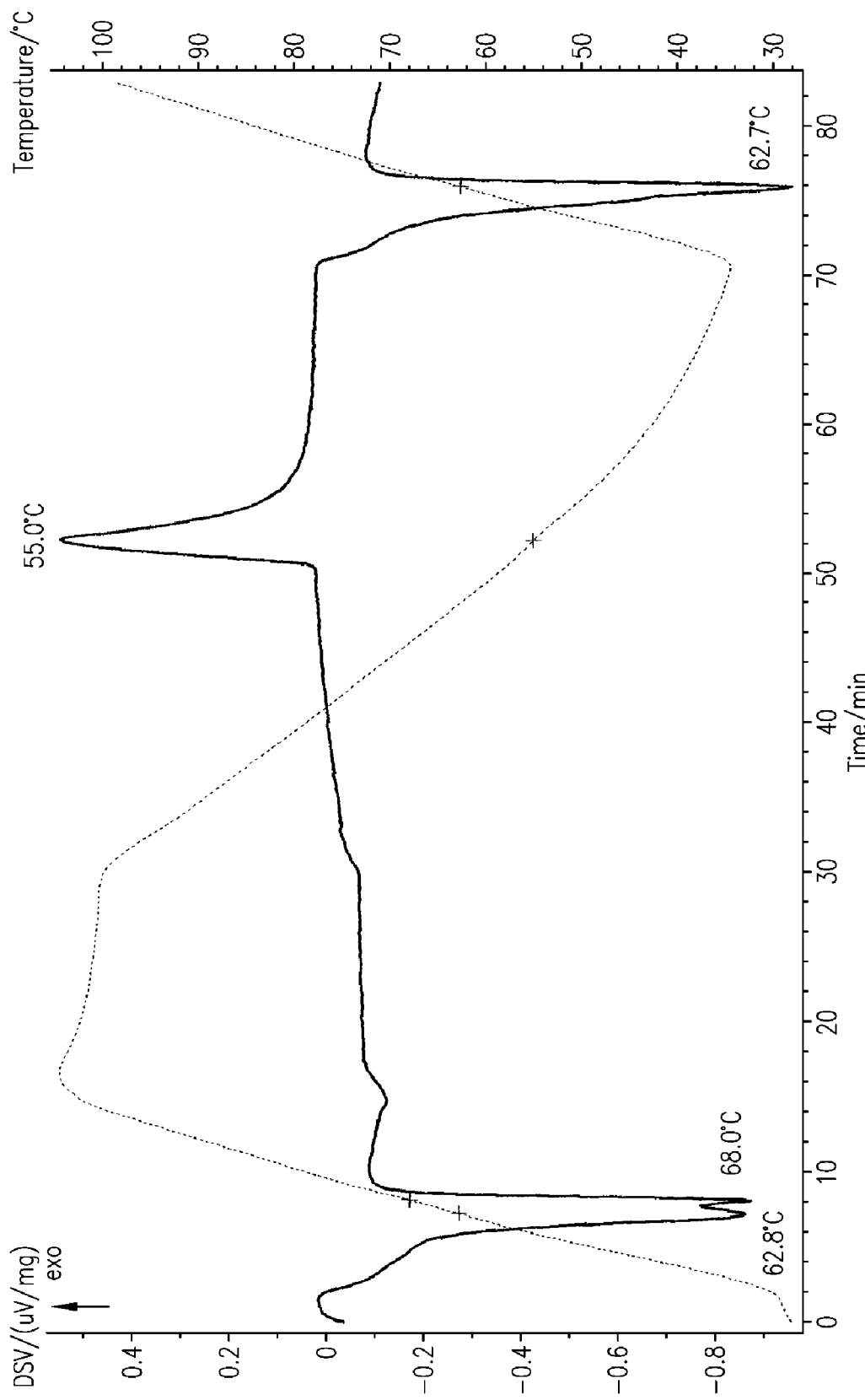
FIG. 3 is a graph of a DSC analysis of a HiDi emulsifier sample containing about 74.5% diglycerides comparing the initial melting point of the sample with melting points after cooling and re-crystallization of the sample.

A DSC melting point analysis of a sample of the HiDi emulsifier of this invention is shown graphically in FIG. 3. In this instance, the initial melting point of the sample was found to be 62.8° C., indicating that the crystalline form of the sample was beta prime. The re-crystallization temperature at about 45 minutes following initial melting was determined to be 55° C. When allowed to cool over a 20-minute period, as previously described, and then immediately remelted, the DSC melting point was determined to be 62.7° C., essentially the same as the initial melting point temperature, and confirming that the sample remained in the desired beta prime form.

The DSC analyses comparing the melting points of an aged fully hydrogenated soybean oil, a monoglyceride emulsifier, and the HiDi emulsifier of this invention confirm that the HiDi emulsifier is in beta prime form.

We claim:

1. A structured shortening for baking goods or food products comprising:
    an emulsifier, said emulsifier comprising a mixture of mono-, di and triglycerides that is the interesterified reaction product of glycerin and a fully saturated fat source, in which the diglyceride portion of the emulsifier is at least about 65%; and
    an amount of a non-hydrogenated vegetable oil, said shortening being primarily in stable beta prime crystalline form, wherein is provided w/w from about 10% to about 30% of the emulsifier with the remainder being non-hydrogenated vegetable oil.

2. A shortening as set forth in claim 1, wherein the diglyceride portion of the emulsifier is from about 70% to about 80%.

3. A shortening asset forth in claim 1, wherein the diglyceride portion of the emulsifier is about 74%.

4. A shortening as set forth in claim 1, wherein is provided w/w from about 15% to about 20% of the emulsifier with the remainder being non-hydrogenated vegetable oil.

* * * * *